United States Patent
Schulmerich et al.

(10) Patent No.: US 6,897,763 B2
(45) Date of Patent: May 24, 2005

(54) RETAIL SIGNAGE MANAGEMENT SYSTEM

(75) Inventors: Dennis B. Schulmerich, Rochester, NY (US); Peter J. Kelch, Rochester, NY (US); Philip J. Smith, Webster, NY (US); James S. Honan, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 111 days.

(21) Appl. No.: 10/636,409

(22) Filed: Aug. 7, 2003

(65) Prior Publication Data

US 2005/0030158 A1 Feb. 10, 2005

(51) Int. Cl.$^7$ .............................................. G05B 19/00
(52) U.S. Cl. ................. 340/5.91; 340/5.92; 340/568.5; 340/572.1; 235/383; 705/22; 705/28; 705/20
(58) Field of Search ............................... 340/5.9, 5.91, 340/5.92, 815.4, 568.5, 572.1; 235/385, 381, 382, 383; 705/20, 22, 23, 28

(56) References Cited

U.S. PATENT DOCUMENTS

| | | | |
|---|---|---|---|
| 5,448,226 A * | 9/1995 | Failing et al. ............. | 340/5.91 |
| 5,493,107 A * | 2/1996 | Gupta et al. ................. | 235/383 |
| 5,503,483 A * | 4/1996 | Petteruti et al. .............. | 400/88 |
| 5,726,431 A * | 3/1998 | VanDonkelaar et al. ..... | 235/383 |
| 5,797,132 A * | 8/1998 | Altwasser .................... | 705/16 |
| 5,920,287 A | 7/1999 | Belcher et al. | |
| 6,046,682 A | 4/2000 | Zimmerman et al. | |
| 6,105,004 A * | 8/2000 | Halperin et al. ............. | 705/28 |
| 6,169,493 B1 | 1/2001 | Goodwin, III | |
| 6,189,788 B1 | 2/2001 | Sherman et al. | |
| 6,253,190 B1 * | 6/2001 | Sutherland .................... | 705/20 |
| 6,550,673 B2 * | 4/2003 | Massaro ....................... | 235/383 |
| 6,552,663 B2 | 4/2003 | Swartzel et al. | |
| 6,768,419 B2 * | 7/2004 | Garber et al. ............. | 340/572.4 |

FOREIGN PATENT DOCUMENTS

| | | | | |
|---|---|---|---|---|
| EP | 1 403 687 A2 | 3/2004 | ........... | G02F/1/133 |
| WO | WO 00/67110 | 11/2000 | ........... | G06F/3/147 |
| WO | WO 02/04975 A1 | 1/2002 | | |
| WO | WO 2004/019265 A1 | 3/2004 | .......... | G06K/15/00 |
| WO | WO 2004/068442 A2 | 8/2004 | | |

OTHER PUBLICATIONS

U.S. Appl. No. 10/256,930, filed Sep. 27, 2002, Stephenson et al.
web site: http//www.powercart.com.
web site: http://www.infologixsys.com/default.asp.

* cited by examiner

Primary Examiner—Jeffery Hofsass
Assistant Examiner—Eric Blount
(74) Attorney, Agent, or Firm—Stephen H. Shaw

(57) ABSTRACT

A mobile retail signage management system includes a communication device capable of transmitting a specific location for which a corresponding sign needs to be positioned at the specific location; a portable workstation including a product database that associates product information with the specific location, wherein the product information includes display information for a corresponding sign positioned at the location. Moreover, the portable workstation communicates to the communication device as the portable workstation comes within the communication range of the communication device, wherein the communication range corresponds to the near vicinity of the portable workstation with respect to the communication device. A sign writer for imaging the corresponding sign in real-time, in the near vicinity of the specific location; and a computer network for updating the database are provided. Additionally a clerk is alerted that the corresponding sign needs to be imaged and positioned at the specific location.

48 Claims, 14 Drawing Sheets

| PRODUCT ID 1201 | LOCATION ID (1202) 1202 | POSITIONING OF SIGN REQUIRED? 1203 | DISPLAY INFORMATION FOR CORRESPONDING SIGN 1204 | PRICE CHANGE REQUIRED? 1205 | UNIT PRICE 1206 | PRICE 1207 | UPDATE COMPLETE? 1208 |
|---|---|---|---|---|---|---|---|
| A | 1001 | NO | -- | YES | $1.99 | $1.99 | |
| B | 2001 | PLACE | Jpeg IMAGE 1 | YES | $2.39 | $2.39 | |
| C | 3001 | REPLACE | Jpeg IMAGE 2 | YES | $3.27 | $3.27 | |
| D | 4001 | REMOVE | Jpeg IMAGE 5 | YES | $1.49 | $1.49 | |
| E | 5001 | PLACE | Jpeg IMAGE 3 | NO | $2.25 | $2.25 | |
| F | 6001 | REPLACE | Jpeg IMAGE 4 | NO | $1.99 | $1.99 | |
| G | 7001 | REMOVE | Jpeg IMAGE 6 | NO | $2.99 | $2.99 | |

FIG. 12

RETAIL SIGNAGE MANAGEMENT SYSTEM

FIELD OF THE INVENTION

The invention relates to a retail signage management system

BACKGROUND OF THE INVENTION

A typical supermarket or grocery store may have 30,000 to 60,000 items (aka Stock Keeping Unit or SKU) available for purchase, of which around 4,000 or more may be promoted each week, particularly through the use of shelf talkers in the aisles of the store. Shelf talkers are signs that are posted near the products being promoted, typically calling attention to a sale price or other information designed to attract the consumer to the product. The use of shelf talker signage requires a significant amount of time to print, sort, and place the shelf talkers at the intended locations in the stores. In large chains, a centralized location may be used to print and sort the shelf talkers for each store, requiring additional time for sorting and delivering. The placement of the shelf talkers is done manually and there is no means for verification that the shelf talkers are appropriately placed.

Several attempts to ensure proper placement of shelf talkers have been made. For example, U.S. Pat. No. 5,448,226 issued Sep. 5, 1995 to Failing, Jr. et al., titled "Shelf Talker Management System" discloses a shelf talker management system wherein a shelf rail includes a plurality of electronic shelf labels for displaying the price of products on the shelf. A store central computer notes shelf talkers that need to be updated and a printer prints the shelf talkers in a sequential order in which the electronic shelf labels (ESL's) occur in the store. A rail of electronic shelf labels is selectively actuated to cause those labels in the rail associated with a product for which an updated shelf talker is required to annunciate an indicia. The indicia may be a flashing light or a blinking display.

After the shelf talkers are printed in order, a clerk inserts a key in a shelf rail to enable tags requiring a new shelf talker to annunciate its location. The clerk matches a shelf talker with an appropriate annunciated ESL and installs the shelf talker adjacent the ESL. Verification of a shelf talker installation is performed by central computer system.

While an improvement in the identification of the shelf talker location is achieved by the system disclosed in U.S. Pat. No. 5,448,226 (Failing, Jr. et al.), the system has the disadvantage that the only provision for assuring that the appropriate shelf talker was placed with the ESL is a visual cross-check of the price on the bib and the price on the display followed by pressing a button on the ESL. This only provides assurance that some shelf talker was placed in the location or removed from the location, and there is still a risk that the wrong shelf-talker was placed. This can result in customer confusion if the information in the shelf talker does not match the product that it was intended to promote. More importantly, the system provides for no significant reduction in the time required to produce, sort, deliver, and place the shelf talkers. The system also requires that product location information be known so that shelf talkers can be printed in order or so that they can be pre-sorted in the order they will be required for placement in the store. Additionally, the disclosed system relies exclusively on two way communication between an ESL and a computer. Special sensors or switches to detect the presence of a shelf talker add cost to the ESL's.

Another example, U.S. Pat. No. 6,169,493 issued Jan. 2, 2001 to Goodwin, III, titled "Shelf Talker Management System And Method" discloses a method of managing shelf talkers using an ESL with in-aisle verification of proper installation of a shelf talker using a bar code reader in a handheld terminal that has communication capability back to a central computer via a central communication base station. In one embodiment, the handheld terminal receives a list of items including a first group of shelf talkers to be installed and a second group of shelf talkers to be removed, and the hand-held terminal is used to scan bar codes on the items or on the shelf talkers.

The system disclosed in U.S. Pat. No. 6,169,493 (Goodwin, III) is intended to enable management of shelf talkers whether ESL's are used or not. There is still no provision for reducing the amount of time required by a clerk to sort signs in the proper order or to find the correct sign to place, either of which can result in excessive time to complete all required placements. In addition, when the system is used in conjunction with an ESL the system relies on a centralized base station to enable the ESL to change its display, thus alerting the clerk to the location of the placement. The required centralized base station results in a more costly ESL/Shelf-talker management system.

Another system proposed to provide a solution for updating both electronic display tags (ESL's) and shelf talkers is described in U.S. Pat. No. 6,552,663 issued Apr. 22, 2003 to Swartzel et al., titled "Product Information Display System With Expanded Retail Display Functions." In this system, a handheld portable wireless terminal communicates with a controller connected for communication with the ESL's, where the portable terminal receives a list of items needing shelf talkers (beard tags). In a guided mode, a store clerk selects one item on the list to perform the required operation, causing the portable unit to communicate back to the system controller to send a signal to the ESL to flash its annunciator. The clerk visually identifies the tag requiring shelf talker maintenance, completes the action, and presses a "step complete" key on the handheld unit. Alternatively, a number of ESL's can be activated in a batch mode where all tags in a particular location are caused to flash their annunciator. This system, similar to the system disclosed in U.S. Pat. No. 6,169,493 (Goodwin, III), requires direct communication with a central controller in order to enable annunciator activation, as well as display changes on the ESL, requiring greater store infrastructure changes such as wiring and wireless communication base installation. This system does not provide for reduction in time spent printing and sorting shelf talkers, and identifying exactly the locations requiring can take time if the clerk is not in the immediate vicinity of the tag when its annunciator is activated.

A system for finding an ESL is disclosed in U.S. Pat. No. 6,046,682 issued Apr. 4, 2000 to Zimmerman et al, titled "Electronic Price Label Including Noisemaker And Method Of Locating Electronic Price Labels," which uses an antenna system to determine the approximate position of an ESL in combination with a noisemaker for producing a sound which is audible to a person to enable a person to "home in" on the location of the ESL.

An additional method for reducing time spent sorting and printing signage is disclosed by providers of carts for printing signage in the aisle at the "point-of-work," such as disclosed by Internet websites for Powercart (http://www.powercart.com) and InfoLogix (http://www.infologixsys.com). However, the technologies for printing the signage can be rate limiting for the speed at which a clerk can place or replace signage in the store. Thermal and laser printed media also have the disadvantage of not being reusable.

U.S. Pat. No. 6,552,663 (Swartzel et al.) also provides for a printer associated with the handheld unit for printing new overlay labels for ESL's. There is no discussion of using the associated printer for use in printing shelf talkers in the vicinity of the ESL.

There remains a need, therefore, for an improved retail signage management system that provides for reduction in the amount of time required to print and place a sign such as a shelf talker in a retail environment. There is also a need to improve verification that the sign was appropriately placed. There is also a need to enable retail signage management in conjunction with a network of electronic shelf labels that does not require communication with a central computer or an intermediate controller to change pricing or manage sign placement. There is a need for signage media which is reusable.

SUMMARY OF THE INVENTION

The need is met according to the present invention by providing a mobile retail signage management system, comprising: a) a communication device capable of transmitting a specific location for which a corresponding sign needs to be positioned at the specific location; b) a portable workstation including a product database that associates product information with the specific location transmitted from the communication device, wherein the product information includes display information for a corresponding sign positioned at the specific location; c) a means for communicating from the portable workstation to the communication device as the portable workstation comes within communication range of the communication device, wherein the communication range corresponds to the near vicinity of the portable workstation with respect to the communication device; d) a sign writer for imaging the corresponding sign in real-time, in the near vicinity of the specific location; e) a means for alerting a clerk that the corresponding sign needs to be imaged and positioned at the specific location; and f) a computer network communicatively connectable to the portable workstation for updating the product database.

ADVANTAGES

The mobile retail signage management system of the present invention has the advantages of improving the productivity of merchandising, increasing accuracy/reliability of signage placement, and reducing cost associated with signage creation/placement by providing for identifying a location for which a signage change is required, enabling real-time printing in the vicinity of the location, and verifying the correct placement of the shelf talker without requiring prior knowledge of the location where the signage change is required. The system of the invention provides for reduction in the amount of time required to print and place a shelf talker in a retail environment and for verification that the shelf talker was appropriately placed. There is also a need to enable shelf talker management in conjunction with a network of electronic shelf labels that does not require communication with a central computer or an intermediate controller.

BRIEF DESCRIPTION OF THE DRAWINGS

FIG. 12 is a table representing a product database in accordance with one embodiment of the present invention.

DETAILED DESCRIPTION OF THE INVENTION

The present invention is directed to a mobile retail signage management system that removes the need for major and complex wiring of stores for communicating with wired and wireless devices such as electronic shelf labels that track price and inventory of store goods. In addition, there now exists a requirement for batch printing of shelf talkers or other signage describing the status of the store goods. To date there are no reusable media for shelf talkers or other signage, consequently, money is lost every time a change to the shelf talker or other signage is implemented.

The following description of the retail signage management system will be principally described with respect to a shelf talker management system, but it will be understood that other retail signage systems, such as signs on clothing racks in a clothing store, or signs on shoe racks in a shoe store can be managed in a similar manner according to the present invention.

Figure 1:
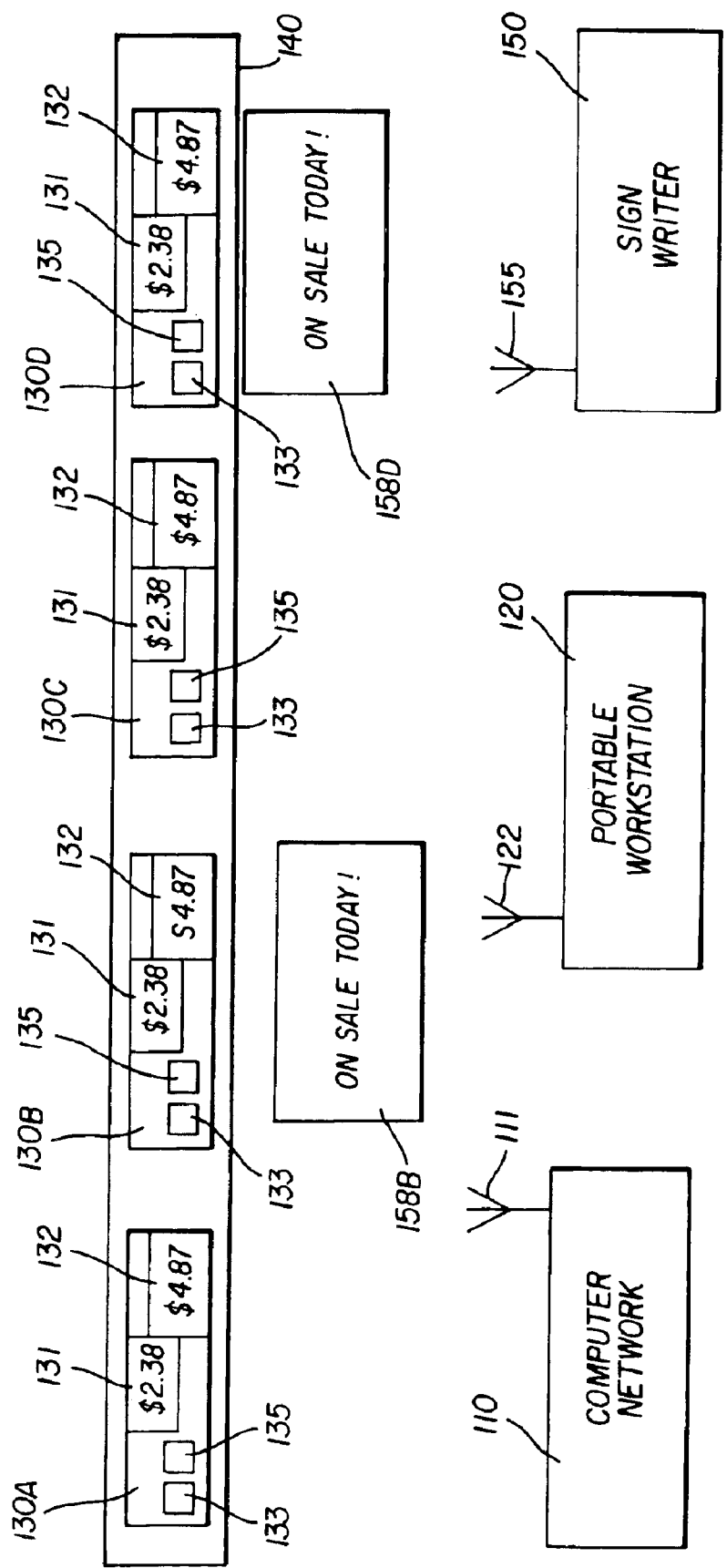
FIG. 1 is a schematic diagram of a retail signage management system according to the present invention.

Referring to FIG. 1, a store shelf rail will have a plurality of shelf labels 130A, 130B, 130C, and 130D, disposed within a channel or holder 140 each associated with a product, for displaying a price for the product. These shelf labels will have been placed to correlate with the product on the shelf prior to placement of any retail signage. The retail signage management system according to one embodiment of the present invention includes a communication device 135 in each of the plurality of shelf labels 130A, 130B, 130C, and 130D capable of transmitting a specific location for which a corresponding sign 158B needs to be positioned at the specific location. For example, shelf label 130B includes a communication device 135 capable of transmitting a specific location for which a corresponding sign 158B needs to be positioned at the specific location. A portable workstation 120 including a product database 121 (shown in FIG. 4) that associates product information with the specific location transmitted from the communication device 135, wherein the product information includes display information for a corresponding sign 158 (see specifically, 158B and 158D) positioned at the location. A computer network 110 communicatively connectable to the portable workstation 120 is provided for updating the database. Associated with the portable workstation 120 is a means for communicating 122 from the portable workstation 120 to the communication device 135 as the portable workstation 120 comes within the communication range of the communication device 135, wherein the communication range corresponds to the near vicinity of the portable workstation 120 with respect to the communication device 135. When a location requiring a sign to be positioned at the location is identified, a sign 158 (here specifically shown as 158B, 158D) is imaged using a sign writer 150 for imaging the corresponding sign 158 in real-time, in the near vicinity of the specific location. To effect the process of positioning a sign once a location requiring a sign has been identified, a means for alerting a clerk that the corresponding sign needs to be imaged and positioned at the specific location is required, such as an alert from the portable workstation 120 or the immediate printing of a sign.

Figure 2:
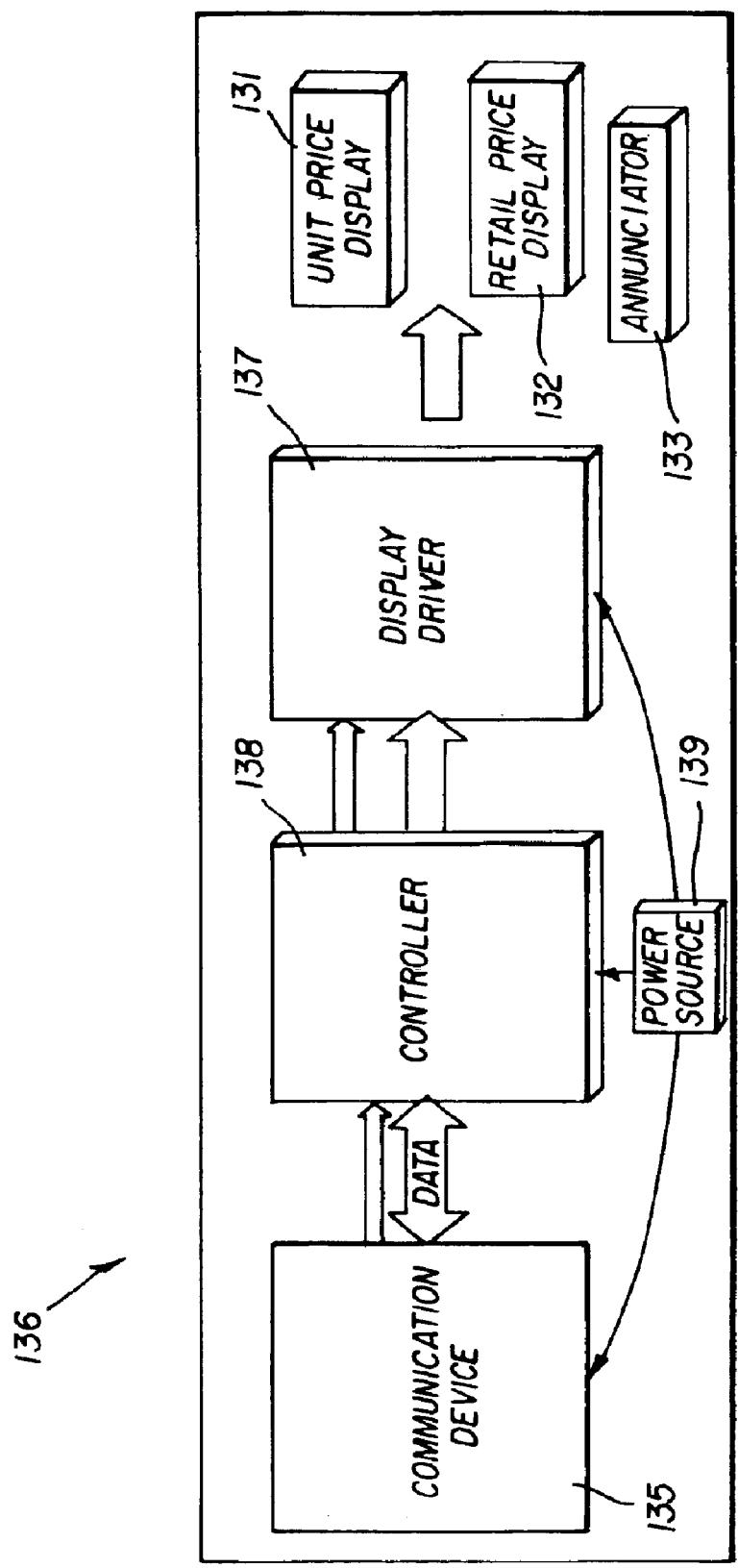
FIG. 2 is a schematic diagram of an electronic shelf label useful with one embodiment of the present invention.

The shelf label 130 includes one or more display(s) 131 and 132 for showing price information, and may also include various printed information (not shown) containing product names, descriptions, bar codes, UPC identifiers, and the like. In one embodiment of the invention, the shelf label may be an electronic shelf label (ESL) where the displays are electronically updatable. FIG. 2 shows a more detailed schematic of such an electronic shelf label 136. The communication device 135 will typically comprise an antenna and either a transmitter or a transceiver. In one embodiment, the communication device 135 is a transceiver with an antenna, for the purpose of both transmitting and receiving signals. The communication device 135 can be a wireless device such as a radio tracking location system (RTLS), or work in a radio frequency identifier (RFID), or other transmissive frequencies such as visible or infrared. The communication device 135 can be continually or periodically transmitting its location, or it can transmit its location for reception by the portable workstation 120 after receiving instruction to do so by the portable workstation 120.

In addition to the communication device 135, a logic controller 138 is connected to display driver electronics 137 for driving the electronically updatable display(s) 131, and 132. It may also contain a power source 139 such as a battery or a solar cell. In one embodiment of the invention, an annunciator 133 for guiding the clerk to the specific location where the corresponding sign is to be positioned using visual or audible means may be included.

The price displayed by the shelf label can be fixed or dynamically updated. In the case of fixed price display, the shelf label can be pre-printed labels or card stock to which a communication device 135 capable of transmitting a specific location for which a corresponding sign 158 needs to be positioned at the specific location is attached or embedded. These may be printed using standard printing techniques such as handwritten, thermally printed, inkjet printed, or the like. In the case of an electronic shelf label 130 that is dynamically updatable, the display may contain one or more of the following technologies: liquid crystals, electrochromic, electrophoretic particles, bichromal beads, zenithal bistable, and electroluminescent. Preferred technologies are those which do not require power to maintain the display, known as "bistable" materials, in which the materials are responsive to some field (heat, electric, magnetic) and remain in the state to which they are driven when the field is removed, especially chiral nematic liquid crystals.

Figure 4:
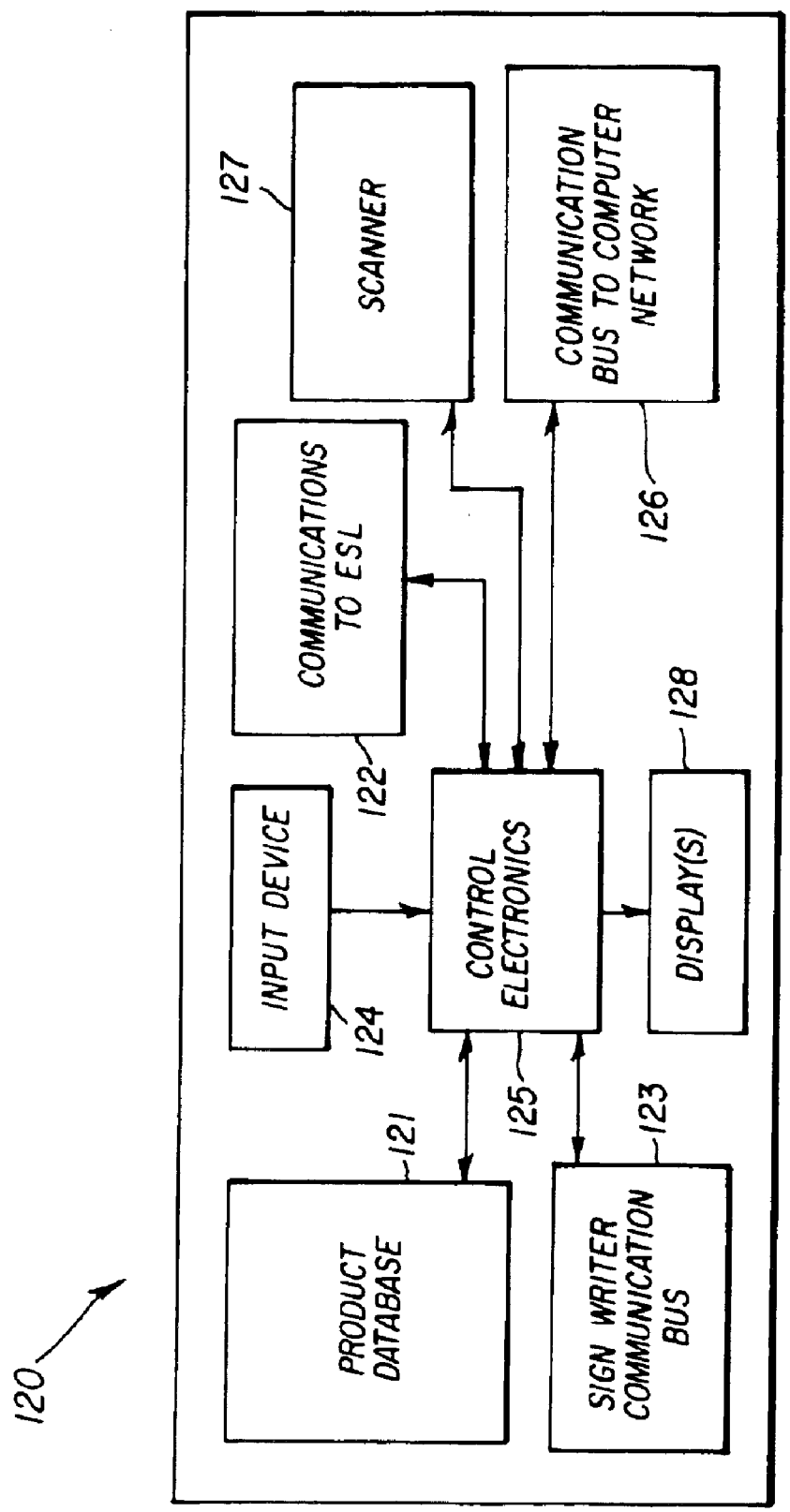
FIG. 4 is a schematic diagram of one embodiment of a portable workstation used in the present invention.

Referring to FIG. 4, a portable workstation 120 includes a product database 121 that associates product information with the specific location transmitted from the communication device 135, wherein the product information includes display information for a corresponding sign positioned at the location. The product database 121 is updated through linking the control electronics 125 of the portable workstation 120 via the communication bus 126 to the computer network 110 (see FIG. 1). A scanner 127 is also connected to the control electronics 125 to enable scanning of UPC bar codes or EPC (electronic product codes). A sign writer communication bus 123 is also connected to the control electronics 125 to enable communication between the sign writer and the portable workstation 120. The communication bus 123 can either be wired or wireless.

Referring to FIG. 12, the information stored in the product database 121 includes a product identifier 1201, a corresponding location identifier 1202, a field to indicate whether a corresponding sign is to be positioned 1203, (e.g. placed, replaced, or removed) and display information 1204 for a corresponding sign for the location. In the instance where the portable workstation 120 is also used for updating prices on electronically updatable shelf labels, the database 121 may also include a field to indicate whether a price change is required 1205 and price information corresponding to the unit price 1206, and the item price 1207. The database may also include an updatable field 1208 indicating whether positioning of a corresponding sign and/or pricing updates have been completed. The portable workstation 120 may also reference a map of the store (not shown) to provide preliminary guidance to the clerk for positioning the sign. Additional fields, such as shelf and aisle position for the product and price label, may also be provided for other purposes as desired.

Figure 6:
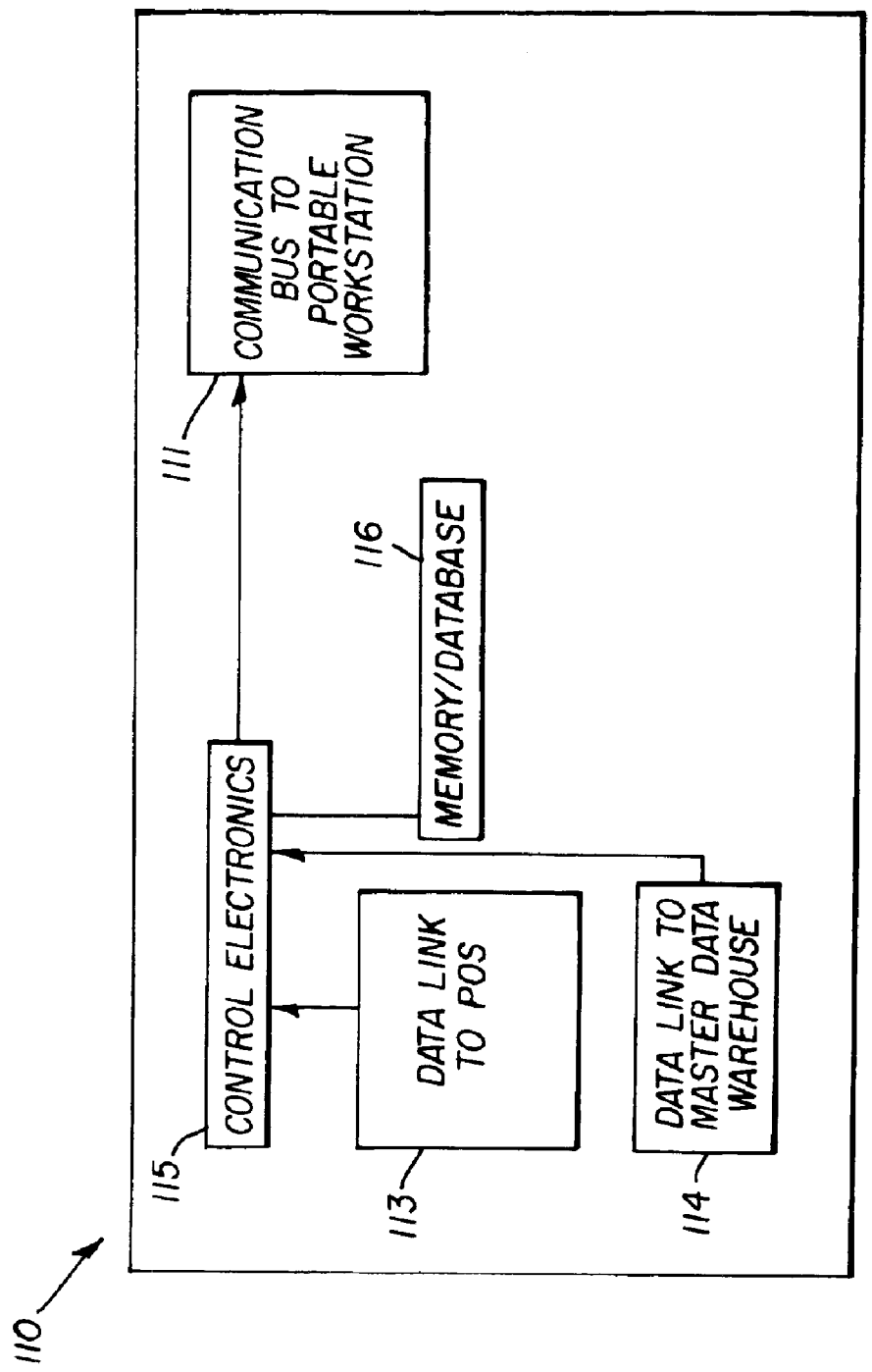
FIG. 6 is a schematic diagram of a central computer used in the present invention.

The computer network 110 shown in FIG. 6, connectable to the portable workstation 120 by wireless or hardwired means 111 (shown in FIG. 1 as wireless) for updating the database, serves as an interface between the retail sign point-of-sale system (POS) and the retail management data warehouse, through communications links 113 and 114, respectively. The retail management data warehouse is the master data center for the retailer, and is not typically directly communicating with the operational systems of the stores, but is rather communicating with systems such as computer network 110 which manage the operations of the store. Control electronics 115 integrates product information, price information, location information, and sign display information to create product database 121 for communication to the portable workstation 120. This and other information are stored in memory 116. The computer network 110 may reside in a central computer for retail operation.

Referring to FIG. 1, the portable workstation 120 further includes a means for communicating 122 (shown here as wireless communication) from the portable workstation 120 to the communication device 135 as the portable workstation 120 comes within the communication range of the communication device 135, wherein the communication range corresponds to the near vicinity of the portable workstation 120 with respect to the communication device 135. The near vicinity of the portable workstation 120 with respect to the communication device 135 should be less than 10 m, preferably from 0.1 m to 7 m, more preferably from 0.5 m to 4 m.

Referring again to FIG. 4, the portable workstation 120 will include capability for interaction with the store clerk operating the system, including an input device 124 such as a keyboard, keypad, or graffiti pad, and a display device 128 such as an LCD display. Both the input and display functions may be combined using an interactive display such as those used in PDA devices. Several other functions may be performed by the means for communicating 122 from the portable workstation 120 to the communication device 135:

to activate price changes on the display(s) of a shelf label; to activate an annunciator 133 or to activate change the display(s) of a shelf label when they are functioning as an annunciator; to enable guidance of the store clerk to the location; to communicate with the computer network 110; to receive confirmation from the communication device 135 that signals were received and acted upon.

When the portable workstation 120 comes within the communication range of the communication device 135, and identifies that the specific location transmitted by the communication device 135 needs a corresponding sign to be positioned at the specific location, a means for alerting a clerk that the corresponding sign needs to be imaged and positioned at the specific location is activated. The means for alerting the clerk can be anything that will call the attention of the clerk to the portable workstation 120, including a light or an audible alert. The portable workstation 120 and the means for alerting the clerk can be integrated in one unit, such as if a laptop computer or a PDA are used where an alert is flashed on the display 128 of the portable workstation 120, either alone or with an accompanying audible alert. An alert flashed on the display 128 can be in the form of a new screen, or a listing of the locations identified with highlights to newly identified locations.

The integration of the portable workstation 120 and the means for alerting the clerk in one unit can also be accomplished by programming the portable workstation 120 to activate the sign writer 150 to image the corresponding sign in real-time, while in the vicinity of the specific location. This would require that if the corresponding sign needs to be removed from a location that the alert be flashed on the display 128 of the portable workstation 120, either alone or with an accompanying audible alert.

It is possible that more than one communication device 135 capable of transmitting a specific location for which a corresponding sign needs to be positioned at the specific location will be detected by the portable workstation 120. The portable workstation 120 can be programmed to either display one location at a time, or to list all the locations identified, with or without corresponding product information. In the case of the former, the portable workstation 120 will alert the clerk to each location in the order in which they are identified and direct the clerk to position the corresponding sign 158. In the case of the latter, the portable workstation 120 can be programmed to direct the clerk to position corresponding signs at each location in the order in which they are identified, while a list of all locations identified is displayed to provide the clerk with the number of locations in the near vicinity for which signs will be positioned. Alternatively, the clerk can select from the list a location for which a corresponding sign is to be positioned, at which time the display information for the corresponding sign is transmitted to the sign writer 150 via the communication bus 123. Selection of a location for which a sign is to be positioned may be made by the use of a scanner 127 incorporated into or associated with the portable workstation 120, or it may be selected by interacting with the portable workstation 120 using the input device 124 or an interactive display 128.

The portable workstation 120 may be embodied in several different ways. The workstation may be a desktop computer or laptop computer and transported on a mobile cart capable of being pushed or pulled through the aisles of the retail establishment. It may be a combination of a handheld unit and a mobile cart containing the sign writer 150 and a cradle for the handheld unit. Mobile carts suited to this invention can be obtained from Powercart (http://www.powercart.com) or InfoLogix (http://www.infologixsys.com). It may be a wearable unit, with a harness to hold both the portable workstation 120 and the sign writer 150.

Referring back to FIG. 1, associated with the communication device 135 may be an annunciator 133 for guiding the clerk to the specific location where the corresponding sign 158 is to be positioned using visual or audible means. The annunciator 133 can be selected from one or more of the following: an icon, an LED, an audible generation device, an image displayed at the shelf label, or an updatable electronic display associated with the shelf label.

When either of price displays 131 and/or 132 are electronically updatable, it is possible to use these to guide the clerk to the specific location where the corresponding sign 158 is to be positioned, eliminating the need for a separate annunciator 133 by combining the annunciator function with the price displays. Use of the price displays 131 and/or 132 as the annunciator can include flashing the unit price or item price, or changing the price to a word, e.g. "look here," or a series of symbols, e.g. "$$$$$$$." One embodiment is to display "++++" to indicate addition or replacement of a shelf talker, or "----" to indicate the removal of a shelf talker. An audibly detectable annunciator 133 may include an audible generation device which produces clicks, chirps, whistles, bells, prerecorded words or phrases, and the like, such as those found in greeting cards and children's books.

Alternatively, the portable workstation 120 itself may function as the annunciator by using wireless means to determine the direction and/or distance where the communication device 135 is located. This can be accomplished using the techniques described in U.S. Pat. No. 5,920,287 issued Jul. 6, 1999 to Belcher et al., titled "Radio Location System For Precisely Tracking Objects By RF Transceiver Tags Which Randomly And Repetitively Emit Wideband Identification Signals," or International Patent Publication No. WO 02/04975, published Jan. 17, 2002 to Brodie, titled "Local Area Beacon System For Position Determination" where local positioning is achieved through the use of one or more antennae to determine the distance and/or direction of a communication device with respect to the portable workstation. In the case that additional antennae are required to enable both distance and direction, they can be added to the sign writer, and to a place on the mobile cart in order to provide enough separation of the antennae to enable the portable workstation to adequately distinguish the signals received by the antennae. When the portable workstation 120 is used to function as the annunciator, a second annunciator may be used as described previously where either a separate annunciator 133 is activated or one or more displays 131, 132 of the electronic shelf label 130 are changed to annunciate the location to which the portable workstation is guiding the clerk. This provides for reducing the amount of time required to locate the location at which a corresponding sign is to be positioned.

Figure 5:
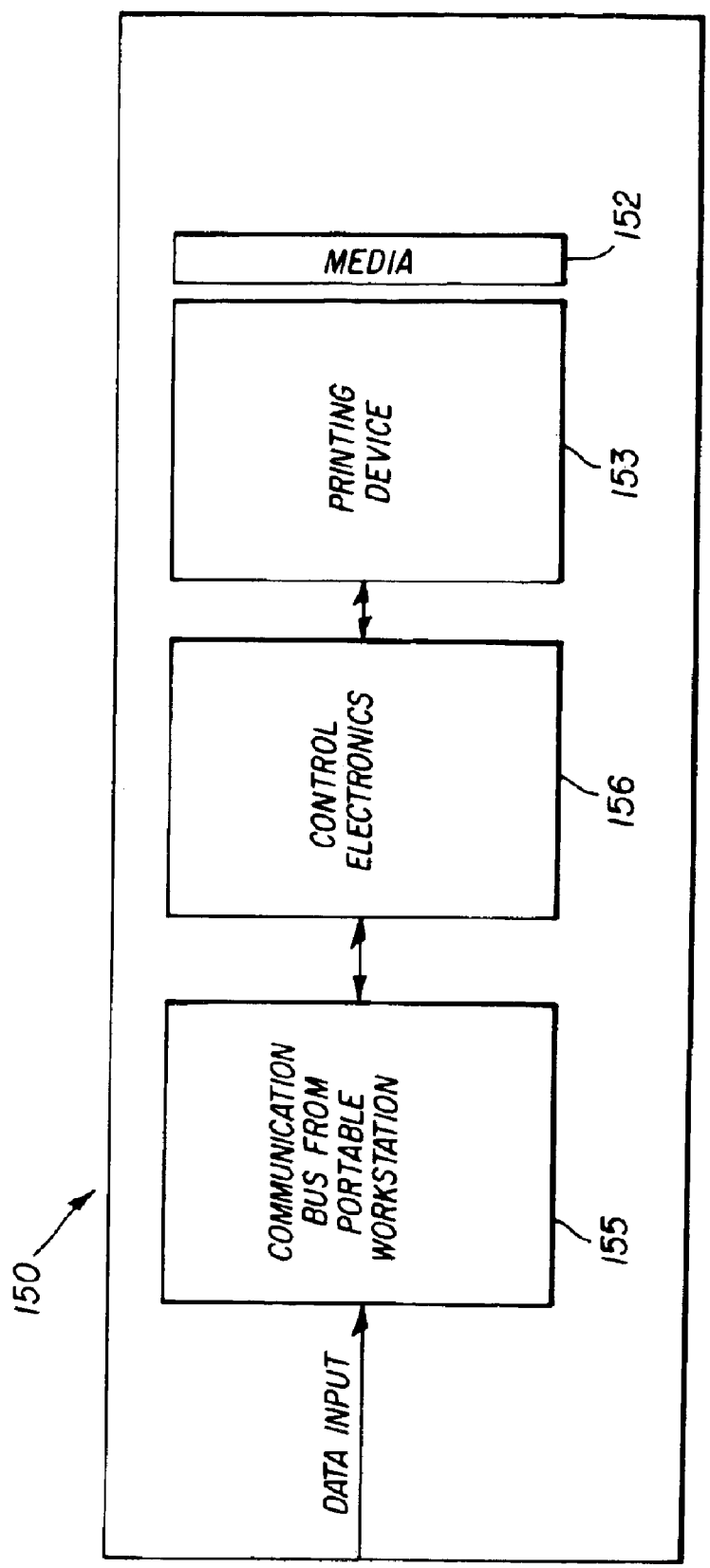
FIG. 5 is a schematic diagram of one embodiment of a sign writer used in the present invention.

Referring to FIG. 5, a sign writer 150 containing a communication bus 155 (also shown in FIG. 1) for receiving display information via communication bus 123 from the portable workstation 120 (see FIG. 4) to produce a sign containing the information is provided. Control electronics 156 then activate the sign writer printing device 153 to images the display information received from the portable workstation 120 to the media 152. The media 152 may be manually inserted to activate the imaging mechanism, or it may automatically draw a new sheet of media from a feed-tray (not shown). It is contemplated that one skilled in the art could combine the sign writer 150 with the portable workstation 120 into one unit, such as in U.S. Pat. No. 6,189,788 issued Feb. 20, 2001 to Sherman et al., titled "Portable Modular Work Station Including Printer And Portable Data Collection Terminal." The sign media 152 may contain identification information such as a bar code, RFID, or the like (not shown) which can be read by the sign writer 150 and communicated back to the portable workstation 120 for updating the product database 121 to correlate the location identifier with the sign identifier.

The sign writer 150 is preferably a device for driving a bistable display technology that can be imaged in a short period of time. These technologies include liquid crystals, electrochromic, electrophoretic particles, bichromal beads. Preferred materials are bistable liquid crystal displays such as chiral nematic, sometimes referred to as cholesteric liquid crystals, which when exposed to an electric field in combination with an image-wise applied radiation, such as thermal energy or light, will form an image and retain the image after the electric field is removed. A description of such a device and media can be found as disclosed in commonly assigned, co-pending U.S. patent application Ser. No. 10/256,930 filed Sep. 27, 2002 by Stephenson et al., titled "Cholesteric Liquid Crystal Display System," which is incorporated herein by reference.

Figure 7:
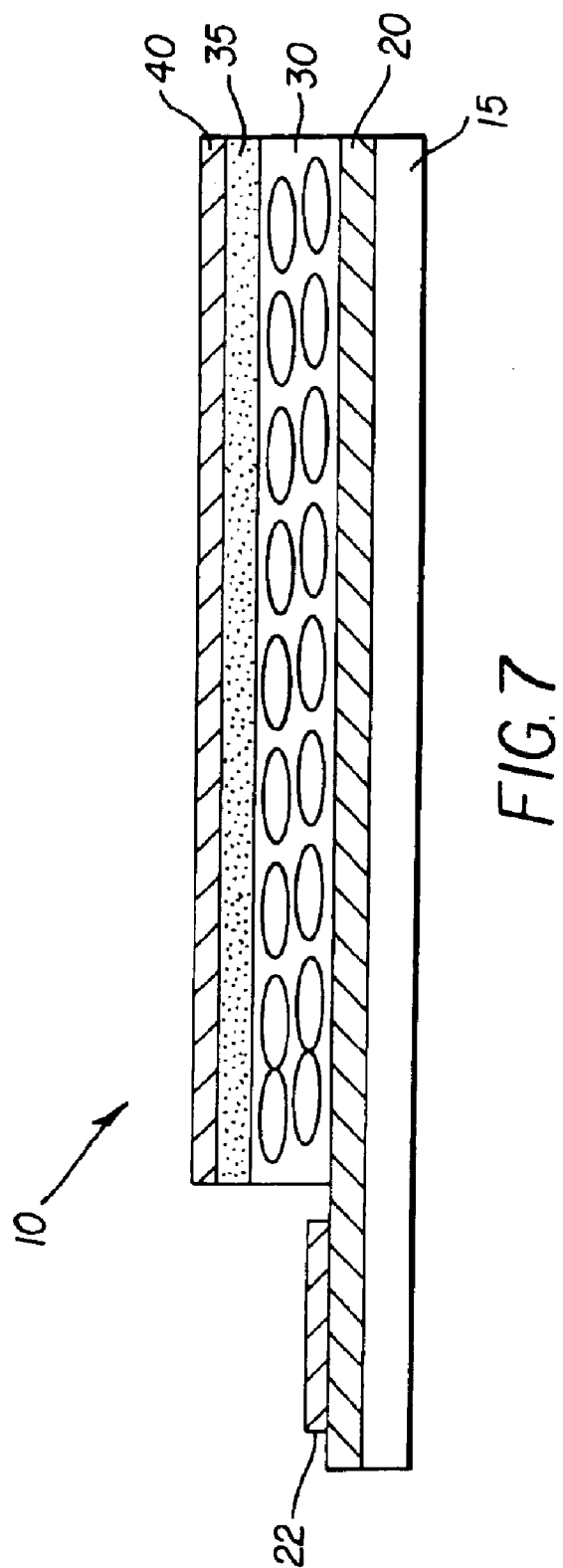
FIG. 7 is a partial cross-sectional view of a light-written display in accordance with the present invention.

Referring to FIG. 7, a display 10 functioning as light written media for use as a retail sign according to the present invention includes a display substrate 15, such as a thin transparent polymeric material. A first transparent conductor 20 is formed on display substrate 15. Typically the material of first transparent conductor 20 is sputtered or coated as a layer over display substrate 15 having a resistance of less than 1000 ohms per square.

In one embodiment, a first conductor cover 22 is printed over first transparent conductor 20. First conductor cover 22 can be screen printed conductive ink such as Electrodag 423SS™ screen printable electrical conductive material from Acheson Corporation. Such screen printable conductive materials comprise finely divided graphite particles in a thermoplastic resin. First conductor cover 22 protects first transparent conductor 20 from abrasion. The second conductor 40 overlays light modulating layer 30 with light absorber 35 disposed between to improve contrast. Second conductor 40 has sufficient conductivity to provide an electric field between the first transparent conductor 20 and second conductor 40 strong enough to change the optical state of the cholesteric material in light modulating layer 30. Second conductor 40 can be formed, for example, by the well known technique of vacuum deposition for forming a layer of conductive material such as aluminum, tin, silver, platinum, carbon, tungsten, molybdenum, tin, indium, or combinations thereof. The layer of conductive material can be patterned using well known techniques of photolithography, laser etching, or by application through a mask.

In one embodiment, second conductor 40 is formed by screen printing a conductive ink such as Electrodag 423SS™ screen printable electrical conductive material from Acheson Corporation (Port Huron, Mich.). Such screen printable conductive materials comprise finely divided graphite particles in a thermoplastic resin. Screen-printing is preferred to minimize the cost of manufacturing the display.

The use of a flexible support for display substrate 15, first transparent conductor 20, light absorber 35, light modulating layer 30, printed second conductor 40, and first conductor cover 22 permits the fabrication of a low cost flexible display. Displays according to the present invention can be used as inexpensive, electronically rewritable signs for use in retail environments and the like.

Figure 8:
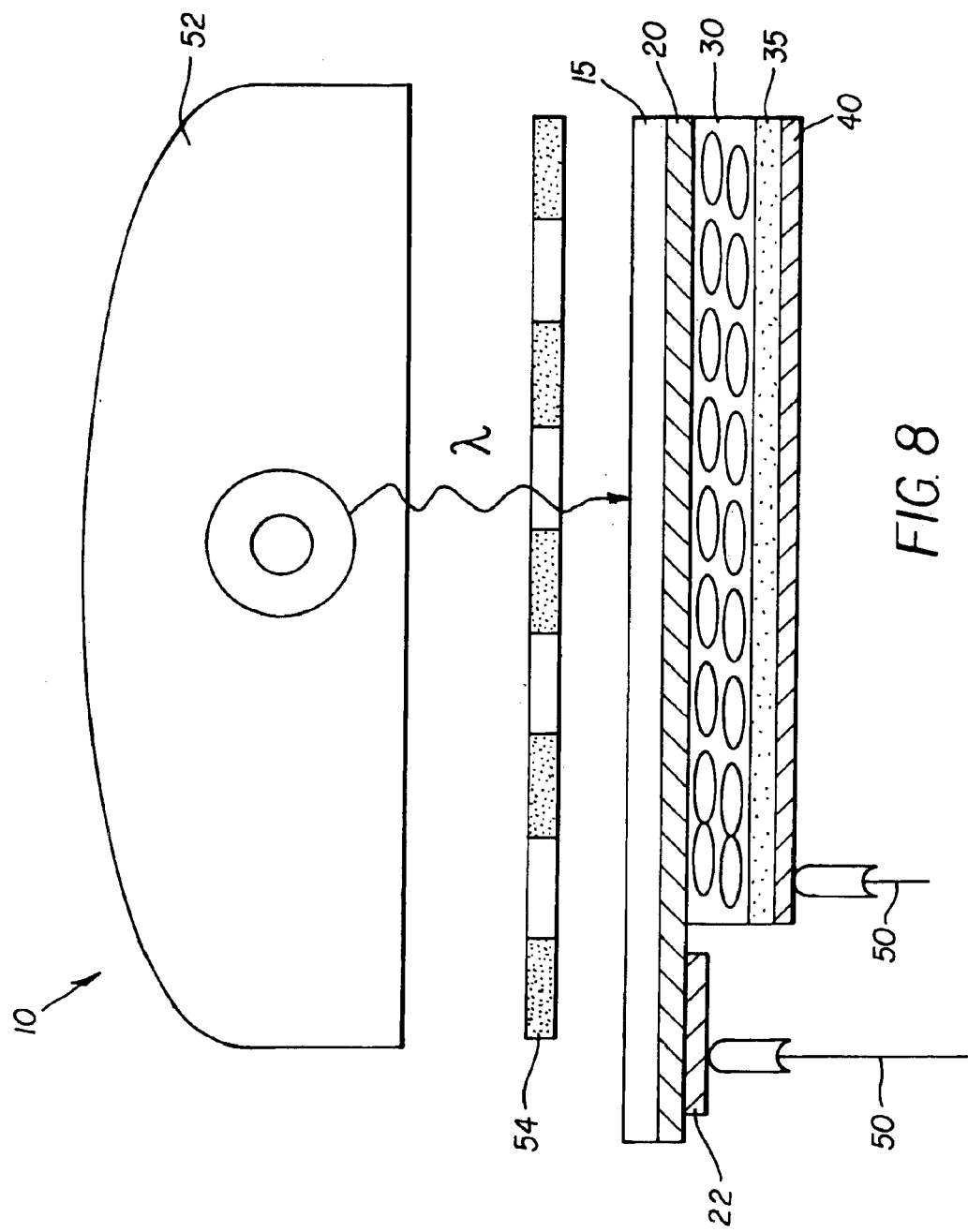
FIG. 8 is schematic side view of an experimental setup used to simulate a display system in accordance with the present invention.

Referring to FIG. 8, a display 10 functioning as light written media in accordance with one embodiment was positioned so that a conventional xenon flash 52 exposed portions of display 10 through mask 54. In the experiment, flash 52 was a Vivitar model 285HV™ professional flash lamp and mask 54 was a sheet of Dupont Mylar™ transparency with an electro-photographic printed image. The output of flash 52 could be adjusted to imprint an image on display 10 if the cholesteric material was initially either a planar state or in a focal-conic state as described in U.S. patent application Ser. No. 10/256,930.

A set of electrodes 50 was applied to first conductor cover 22 and second conductor 40. An electrical field was applied across electrodes 50, and flash imprinted images on display 10 were erased. Display 10 could be imprinted and erased multiple times without damage to display 10. Display 10 was positioned so that the black second conductor 40 faced flash 52 and mask 54. Flash 52 could be adjusted so that images were imprinted through second conductor 40. Images made in the reversed manner could be electrically erased using a field across electrodes 50. From these experiments, it was concluded that the printing process occurs due to thermal energy being applied to second conductor 40 through either side of display 10. A heat pulse of correct power and duration provides a thermal flux effect that can write cholesteric material into either the planar or focal-conic state. These experiments are the first demonstration of the use of masked high-intensity light to thermally print and reprint images on polymer dispersed cholesteric liquid crystals. The method and materials permit multiple erasure and writing cycles. Furthermore, the structure of display 10 is flexible and low-cost.

Figure 9:
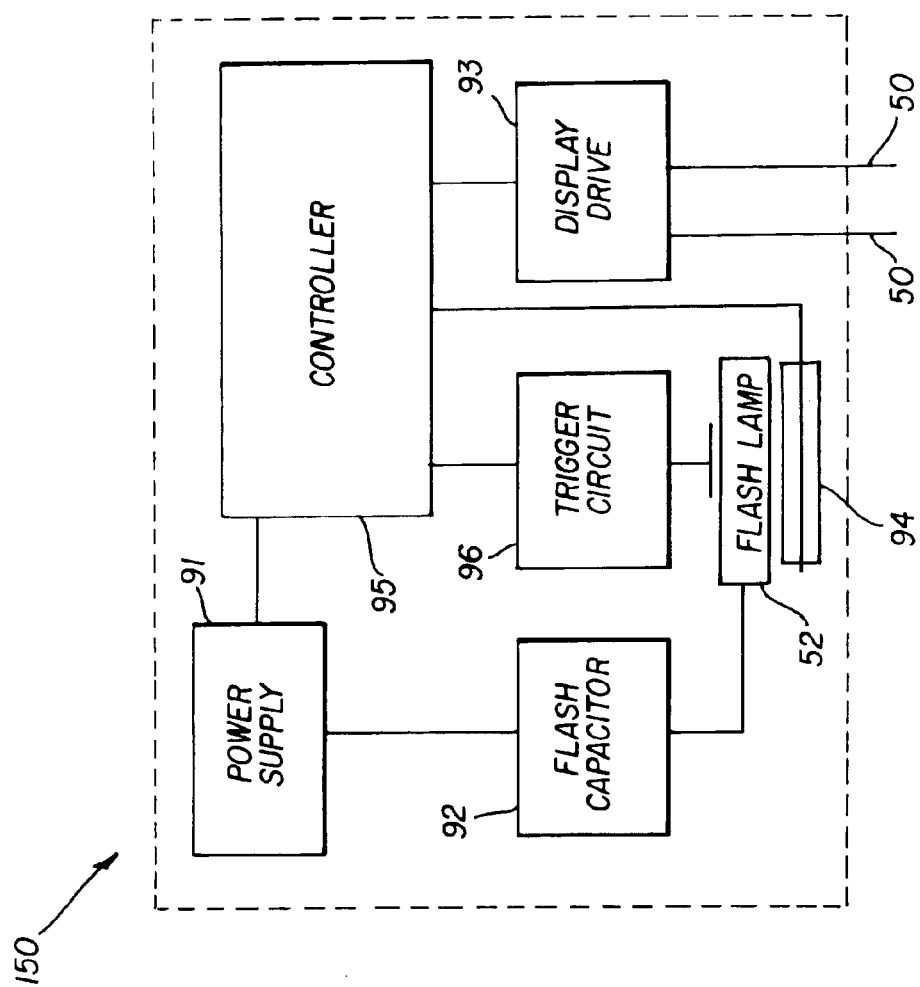
FIG. 9 is an electrical schematic diagram for a display writer in accordance with the present invention.

FIG. 9 is an electrical schematic for a sign writer 150 functioning as a light writer made in accordance with the present invention. A power supply 91 provides power to a flash capacitor 92 and to a controller 95. A masking display 94 is disposed to selectively mask the output of flash 52. Masking display 94 can be a simple twisted-nematic (TN) or super-twisted-nematic (STN) display of conventional design. Controller 95 supplies information to masking display 94. Controller 95 applies writing voltage to electrodes 50 through display drive 93, connected to display 10. A trigger circuit 96 triggers flash 52 in conjunction with the application of a bipolar electrical field from display drive 93. The flash energy is masked by masking display 94 to apply an image-wise light pattern from flash lamp 52 in conjunction with an applied field to write an image on display 10. The total amount of time to image the display 10 for use as a sign is less than 2 seconds.

The critical feature to the sign writer 150 is the ability to image the sign 158 in real-time, that is to say, the sign 158 is imaged and ready to be placed quickly enough that it adds no significant time to the total amount of time from the selection of the sign 158 to be imaged to the time the sign 158 is placed. The sign, regardless of its size, should be imaged in less than 10 seconds, preferably less than 5 seconds, more preferably less than 3 seconds, and most preferably less than 2 seconds. The amount of time to place the sign is then a function of how quickly a store clerk may identify the placement location for the sign. Consequently, an annunciator function will enable the store clerk to identify the location for positioning the sign more quickly, with desired times of less than 30 seconds; and preferably less than 20 seconds, and more preferably less than 10 seconds for placement of the sign once the sign is imaged and printed at or near the vicinity of the shelf label. The total time of the actual selection of the sign to be positioned to the actual positioning of the sign is less than 40 seconds, preferably less than 25 seconds. One should note that these times are exemplary embodiments that may be practically impacted in the field of use by shelf height, clerk recognition and distraction, etc.

The sign writer 150 can also be selected from well-known printing technologies, such as thermal printers, ink-jet printers, and laser printers, so long as the criteria for printing in real-time are met.

Figure 10:
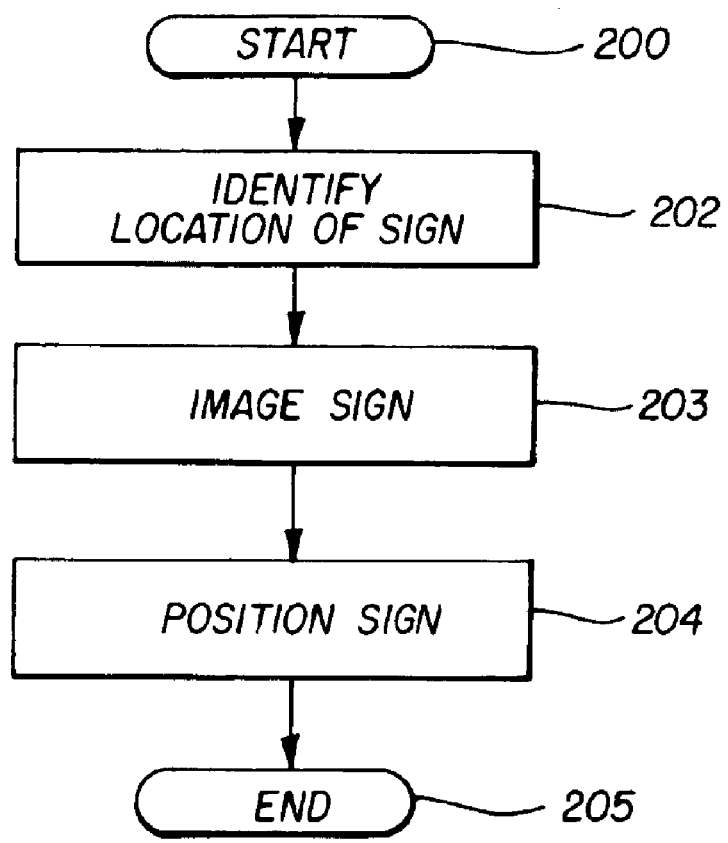
FIG. 10 is an overall system diagram of a retail signage management system according to the present invention.
Figure 11A:
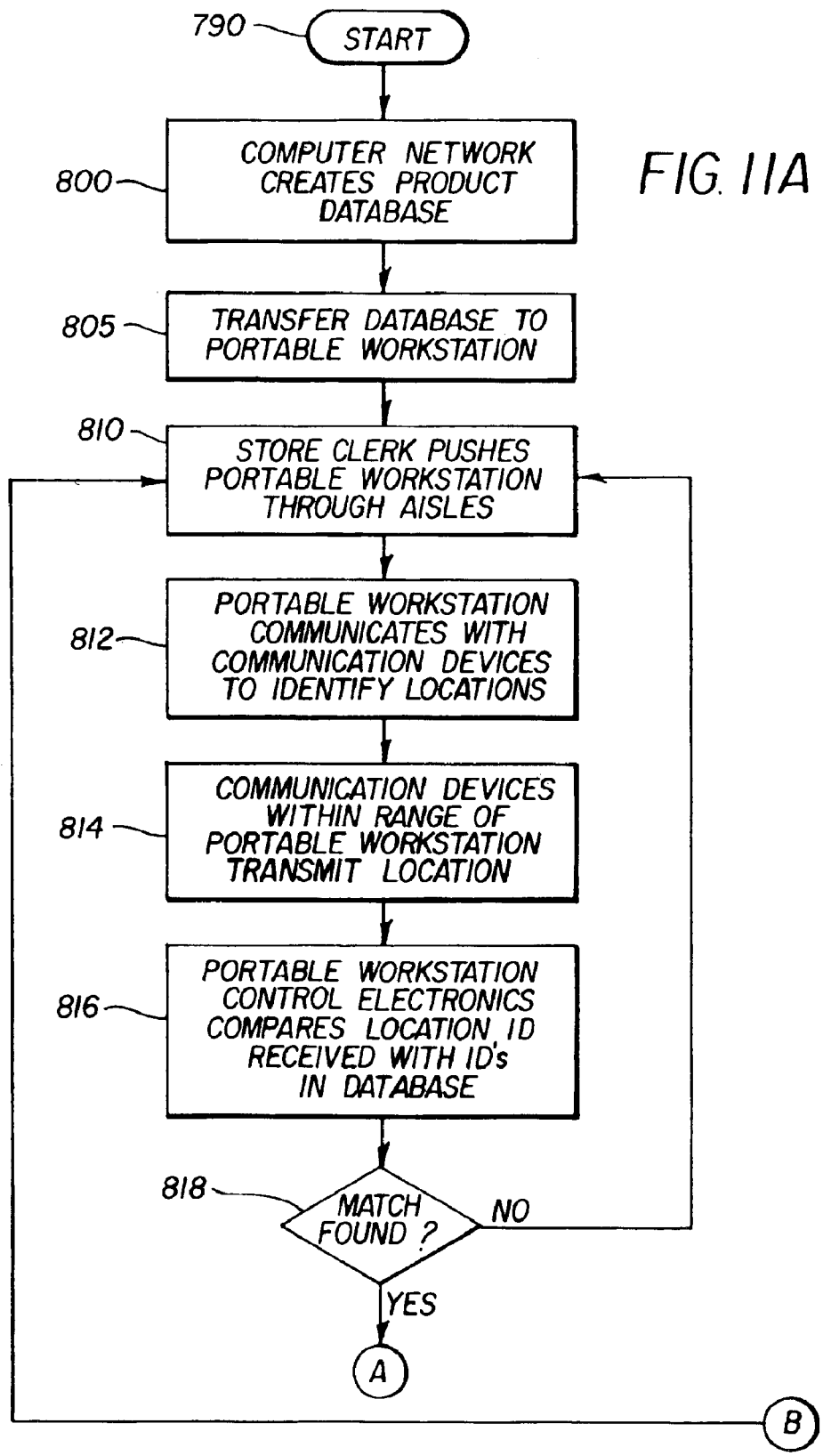
FIGS. 11A, 11B, and 11C are detailed system diagrams of the retail signage management system of FIG. 10.
Figure 11B:
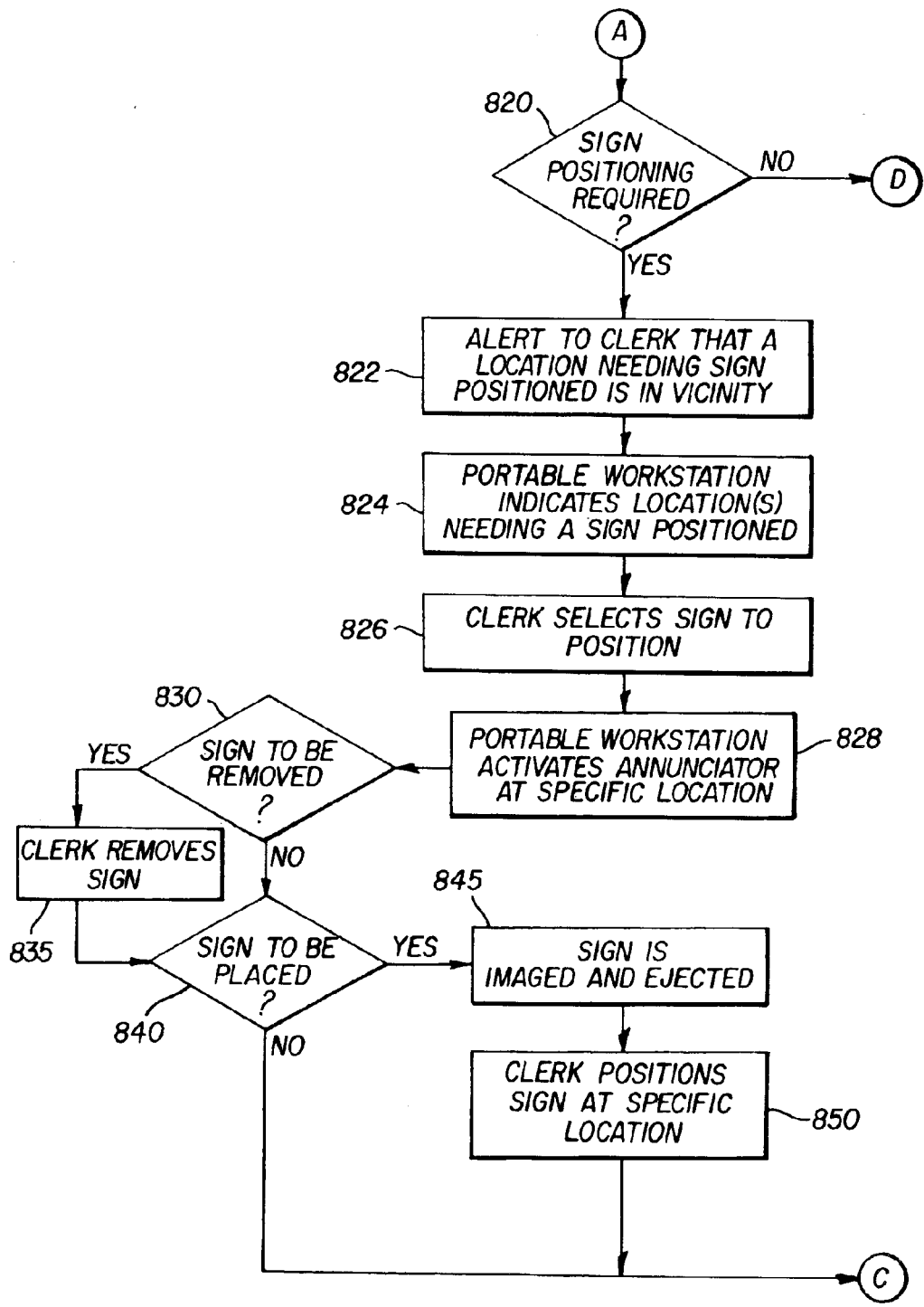

The retail signage management system is generally described by the steps outlined in FIG. 10, which are expanded upon in FIGS. 11A, 11B, and 1C. The process starts at step 200, when the portable workstation 120 receives the product database 121 from the computer network 110. The location at which a corresponding sign needs to be positioned is identified 202, then the sign is imaged 203, and the sign is then positioned 204 at the identified location.

Figure 11C:
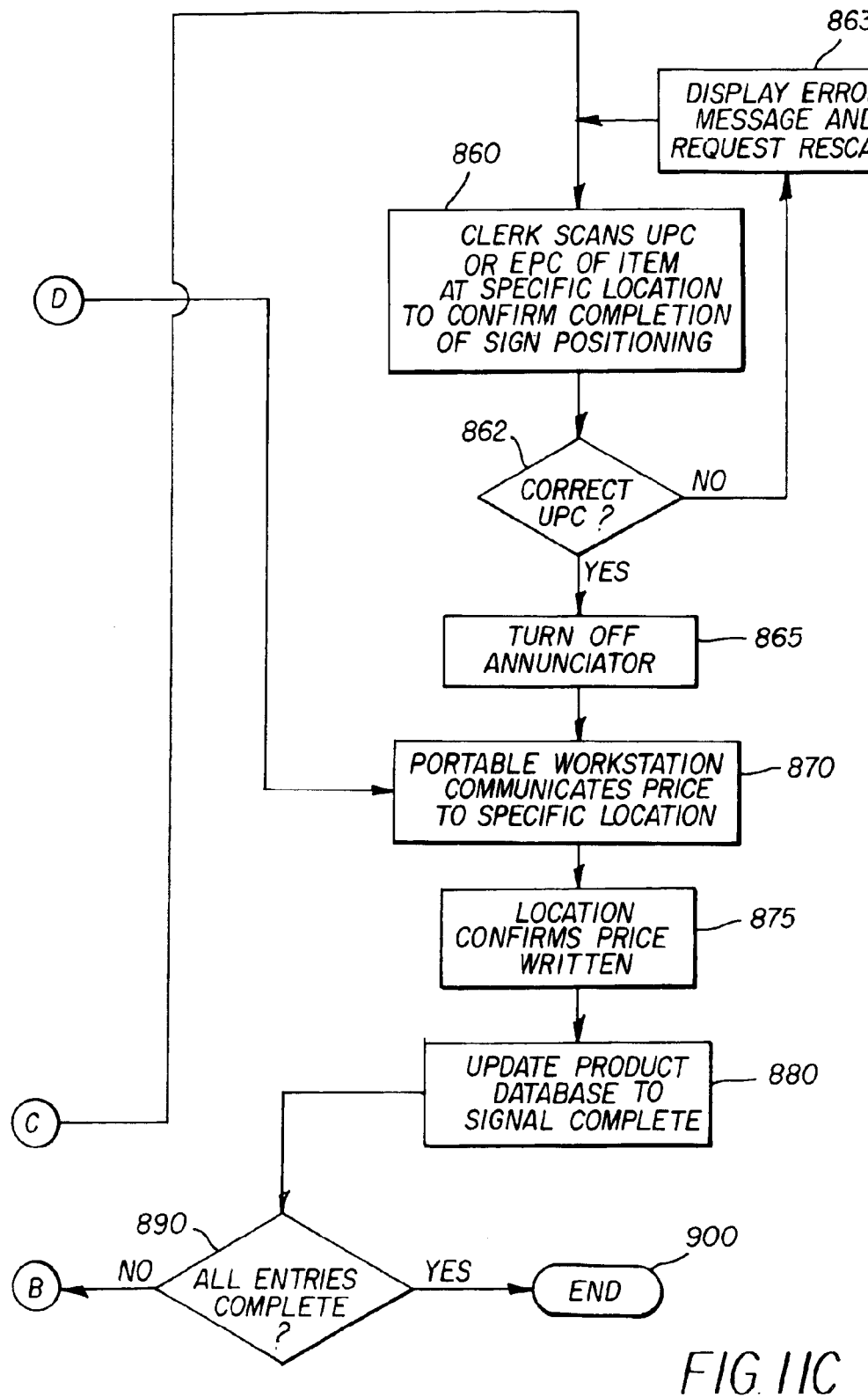

An expanded description of the retail signage management system of the invention is shown by the workflow shown in FIGS. 11A, 11B, and 11C, with step references in parentheses. Steps (800) to (835) correspond to identifying the location at which a corresponding sign needs to be positioned. Steps (840) to (845) correspond to the imaging of the sign, and steps (850) to (880) correspond to positioning the sign.

To begin 790, the computer network 110 initiates the workflow by identifying locations for which a corresponding sign needs to be positioned at the specific location and creates a product database 121 for transfer to the portable workstation 120 (800). For this example, the product database shown in FIG. 12 will be used, where products requiring price changes instead of or in addition to positioning of corresponding signs are included. No entries in the database are required for locations where neither price nor sign changes are required.

The computer network 110 transfers the product database 121 to the portable workstation 120 (805). When the transfer is complete, a store clerk can then transport the portable workstation 120 through the aisles of the store (810). A predetermined or regular pattern can be used to move through the aisles of the store in order to ensure that no locations are missed.

The portable workstation 120 continuously interrogates the communication devices 135 at each location within its range (812), which respond to the portable workstation 120 with their location identifiers (814). The control electronics 125 of the portable workstation 120 then compares location identifiers with the product database received from the computer network (816) to determine if a match is found (818). If a match is not found, the clerk continues through the aisle (810) and the control electronics 125 compares the next location identifier received after returning to step (812). If a match is found, the control electronics 125 determines from the database if a sign needs to be positioned (820).

If a sign does not need to be positioned, the control electronics 125 communicates the new price of the product to the location identifier (870) and the display of the electronic shelf label is updated to reflect the new price. Recall that the entries in the database are only those locations requiring signs to be positioned, price changes or both, so if a sign does not need to be positioned, a price change is assumed.

If a sign needs to be positioned (820), in this embodiment indicated by the presence of "Place," "Replace," or "Remove" in field 1203 of the database in FIG. 12, then the clerk is alerted to the need for a sign to be positioned (822). The portable workstation 120 indicates the location(s) that need a sign to be positioned (824). The clerk selects the location for the sign to be positioned (826), either through interaction with the portable workstation 120 or through the use of the scanner 127 of the portable workstation 120 applied to the shelf label 130 requiring the change. The portable workstation 120 then activates an annunciator (828) to guide the clerk to the specific location where the corresponding sign is to be positioned.

At step (830), the portable workstation 120 determines if there is a sign 158 to be removed, indicated by the presence of "remove" or replace" in the database field 1203 (see FIG. 12). If the answer is no, the portable workstation 120 proceeds to step (840). If the answer is yes, the clerk is instructed to remove the sign (835) while the portable workstation 120 proceeds to step (840). At step (840), the portable workstation 120 determines if a sign is to be placed by the presence of "replace" or "place" in the database field 1203 (see FIG. 12). If the answer is no, the portable workstation 120 proceeds to step (860). If the answer is yes, the sign writer 150 is activated, either automatically by the portable workstation 120 or manually by the clerk and the sign 158 is imaged and ejected (845) using the display information stored in the product database 121. The clerk then positions the sign at the location to which it corresponds, using the annunciator to guide the clerk to the correct location (850). The portable workstation 120 then proceeds to step (860).

It is possible that the writing of the new sign (845) and the removal of the sign currently in place (835) can occur simultaneously or in reverse order from that shown in the diagram.

After positioning of the sign (850), the clerk scans the UPC or EPC of the ESL where the change took place to confirm completion of the change (860). If the location scanned does not match the location the control electronics 125 has registered as the location selected for the sign to be positioned (862), an error message will call for the clerk to confirm correct placement of the sign and to rescan the location (863). When the control electronics 125 verifies that the scanned location and the selected location are the same, the portable workstation 120 signals the shelf label to turn off its annunciator (865). The portable workstation 120 communicates the price of the product to the location identifier (870). The display of the electronic shelf label is updated to reflect the new price and the shelf label then sends a signal to the portable workstation 120 to indicate that the update of the price is complete (875). The product database 121 is updated to indicate that the price change and/or sign positioning has been made (880).

The control electronics 125 of the portable workstation 120 then determines if all the products in the database have been updated (890). If they have, then the clerk is finished (900) and returns the portable workstation 120 to receive transfer of the next product database. If there are still locations requiring signs to be positioned or prices to be changed, the clerk continues through the aisles (810) until the portable workstation 120 identifies another tag requiring a change. The workflow continues until the entire store has been completed.

The workflow of the invention (FIGS. 11A, 11B, and 11C) is illustrated with the following examples according to the database presented in FIG. 12. These examples assume that the portable workstation 120 presents to the clerk only one product requiring a signage change at a time, there is only one price on the display, and that the products are encountered in the order listed.

After the computer network 110 has created a product database 121 according to FIG. 12, it is transferred to the portable workstation 120, after which the clerk begins to move through the aisles of the store (800–810). The portable workstation 120 continuously interrogates the communication devices 135 at each location within its range (812). Communication device 135 responds to the portable workstation 120 with its Location ID 1001 and the portable workstation 120 identifies that Location ID 1001 is in the database (814–818). The portable workstation 120 subsequently determines that a sign does not need to be positioned at that location (820), and the control electronics 125 communicates the new price of the product to the communication device 135 (870) and the display of the electronic shelf label is updated to reflect the new price (875 and 880).

The clerk proceeds while the portable workstation 120 continuously interrogates the communication devices 135 at each location within its range (812). Communication device 135 of a different location responds to the portable workstation 120 with its Location ID 2001. The portable workstation 120 identifies that Location ID 2001 is in the database (814–818). The portable workstation 120 determines that a sign needs to be positioned at that location (820). The clerk is alerted that a corresponding sign needs to be positioned for the location ID 2001, corresponding to product B. The clerk acknowledges the alert and the portable workstation 120 activates the annunciator 133 (822–828). Since no sign is to be removed, the sign writer 150 is activated by the portable workstation 120 and the sign is written using the display information (Jpeg image 1) stored in the product database 121 (steps 830–845). The clerk then positions the sign at the location to which it corresponds, using the annunciator 133 to guide the clerk to the correct location (850). After the positioning of the sign is completed, the clerk scans the UPC of the ESL where the sign was positioned to confirm completion of the positioning (860). The portable workstation 120 verifies that the scanned location is the same as the selected location and the portable workstation 120 signals the shelf label to turn off its annunciator 133 (865). The portable workstation 120 proceeds to communicate the new price of the product to the location identifier (870). The display of the electronic shelf label is updated to reflect the new price and the shelf label then sends a signal to the portable workstation 120 to indicate that the update of the price is complete (875). The product database 121 is updated to indicate that the price change and sign positioning was completed (880).

The clerk proceeds through the store to complete the changes for products C and D, where removal of a sign is required. For tags E, F, and G, the tag displays are rewritten, although this is not required since there was no price change. This can be eliminated for the sake of reducing power consumption in the electronic price labels.

Figure 3:
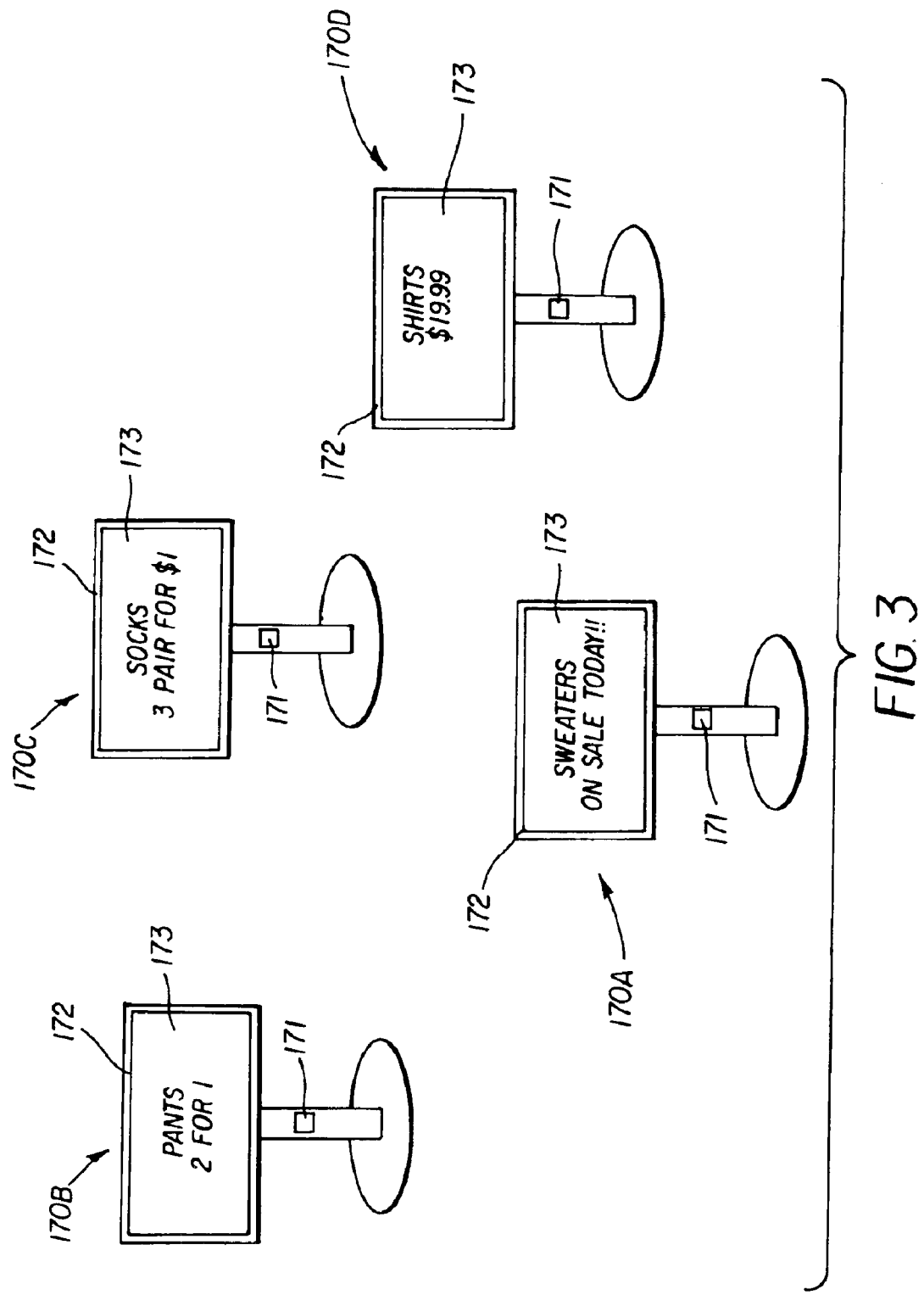
FIG. 3 is a schematic diagram of merchandising signage useful in one embodiment of the present invention.

Referring to FIG. 3, the use of merchandising signage 170A, 170B, 170C, and 170D such as on clothing or shoe racks, may not require individually priced items or price labels as in a grocery store. In this case, the communication device 171 can be embedded in or attached to either the sign holder 172 or the rack on which the sign is located (not shown). The sign media 173 can be written with the sign writer 150 of the invention. Referring to FIGS. 11A, 11B, and 11C, the workflow for this embodiment would be somewhat modified. The answer to step 820 would always be Yes. Step 828 might require that the annunciation be in the form of using wireless means to determine the direction and/or distance where the communication device 171 is located, unless the sign holder and/or rack is fitted with a visible or audible annunciator 133 associated with the communication device 171. Steps 860, 862, and 863 would be accomplished via use of an additional communication to the specific location, preferably at short range where the clerk would be required to be close enough to the communication device 171 to ensure that no other devices were responding. Alternatively, the sign holder 172 or rack could be provided with scannable indicia, such as a bar code, for verification purposes. Steps 870 and 875 could be eliminated.

The invention has been described in detail with particular reference to certain embodiments thereof, but it will be understood that variations and modifications can be effected within the spirit and scope of the invention.

PARTS LIST 10 display function as light written media for use as a sign
15 display substrate
20 first transparent conductor
22 first conductor cover
30 light modulating layer
35 light absorber
40 second conductor
50 electrode
52 xenon flash
54 mask
91 power supply
92 flash capacitor
93 display drive
94 masking display
95 controller
96 trigger circuit
110 computer network
111 wireless or hardwired communication to portable workstation
113 link to store POS
114 link to merchandising data
115 control electronics
116 memory
120 portable workstation
121 product database
122 communication
123 communication bus to sign writer
124 input device
125 portable workstation control electronics
126 communication bus to computer network
Parts List—continued
127 scanner
128 display for portable workstation
130 electronic shelf label
130A electronic shelf label
130B electronic shelf label
130C electronic shelf label
130D electronic shelf label
131 unit price display
132 retail price display
133 annunciator
135 communication device
136 electronic shelf label
137 display driver
138 logic controller
139 power source
140 C-channel shelf rail
141 C-type channel clip
142 lip 143 extrusion
144 channel
150 sign writer
145 formed lips on channel clip 141
152 media for sign writer
153 printing device
155 communication bus
156 control electronics
158 sign
158B sign
158D sign
Parts List—Continued
170 merchandising sign
170A merchandising sign
170B merchandising sign
170C merchandising sign
170D merchandising sign
171 communication device
172 sign holder
173 sign media
200 process start
202 identify location of sign
203 image sign
204 position sign
205 process end
790 start
800 create product database
805 transfer database to portable workstation
810 store clerk pushes portable workstation through store
812 identify locations
814 transmit locations
816 compare location ID with ID's in database
818 match is found
820 determine if sign needs to be positioned
822 alert to clerk that there is a need for a sign to be positioned
824 portable workstation indicates location(s) needing a sign positioned
826 clerk selects sign to be positioned
828 annunciator activated at specific location
830 determine if a sign is to be removed
835 clerk to remove sign
840 determine if sign is to be placed
Parts List—continued
845 sign is imaged and ejected
850 clerk positions sign
860 clerk scans item to confirm completion of change
862 determine if match is found
863 error message and request rescan
865 turn off annunciator
870 new price of product to location identifier
875 price update complete
880 price change and/or sign positioning complete
890 determine if all products in database have been updated
900 end
1201 product identifier
1202 location identifier
1203 positioning sign
1204 display information
1205 price change required
1206 unit price
1207 item price
1208 update status

What is claimed is:

1. A mobile retail signage management system, comprising:

a) a communication device capable of transmitting a specific location for which a corresponding sign needs to be positioned at the specific location;

b) a portable workstation including a product database that associates product information with the specific location transmitted from the communication device, wherein the product information includes display information for a corresponding sign positioned at the specific location;

c) a means for communicating from the portable workstation to the communication device as the portable workstation comes within communication range of the communication device, wherein the communication range corresponds to the near vicinity of the portable workstation with respect to the communication device;

d) a sign writer for imaging the corresponding sign in real-time, in the near vicinity of the specific location;

e) a means for alerting a clerk that the corresponding sign needs to be imaged and positioned at the specific location; and f) a computer network communicatively connectable to the portable workstation for updating the product database.

2. The mobile retail signage management system claimed in claim 1, wherein the communication device is associated with an electronically updatable shelf label displaying the product information.

3. The mobile retail signage management system claimed in claim 1, wherein the communication device is associated with a holder that holds the corresponding sign.

4. The mobile retail signage management system claimed in claim 1, wherein the communication device is associated with a shelf label displaying the product information.

5. The mobile retail signage management system claimed in claim 1, wherein the portable workstation and the means for alerting a clerk are integrated in one unit.

6. The mobile retail signage management system claimed in claim 5, wherein the integrated unit of the portable workstation and the means for alerting a clerk include the sign writer for imaging the corresponding sign in real-time, while in the vicinity of the specific location.

7. The mobile retail signage management system claimed in claim 1, wherein the portable workstation and the means for communicating from the portable workstation are integrated in one unit while communicating within the communication range corresponding to the near vicinity of the integrated unit with respect to the communication device.

8. The mobile retail signage management system claimed in claim 1, wherein the communication device operates as a wireless device selected from the group consisting of a radio tracking location system (RTLS), a radio frequency identifier (RFID), visible wavelength transmissions, and invisible wavelength transmissions.

9. The mobile retail signage management system claimed in claim 1, wherein the sign writer is a light writer capable of imaging the product information for the corresponding sign on light writable media.

10. The mobile retail signage management system claimed in claim 1, wherein the corresponding sign is reusable media and selected from the group consisting of a liquid crystal display, zenithal bistable display, electrochromic display, electrophoretic display, and bichromal bead display.

11. The mobile retail signage management system claimed in claim 9, wherein the light writable media is a bistable cholesteric liquid crystal display.

12. The mobile retail signage management system claimed in claim 1, wherein the means for alerting a clerk includes an onscreen image on the portable workstation and/or an image on the corresponding sign.

13. The mobile retail signage management system claimed in claim 1, wherein the means for alerting a clerk includes an audible warning.

14. The mobile retail signage management system claimed in claim 1, wherein the computer network resides in a central computer for retail operation.

15. The mobile retail signage management system claimed in claim 1, further comprising:
   g) an annunciator for guiding the clerk to the specific location where the corresponding sign is to be positioned using visual or audible means.

16. The mobile retail signage management system claimed in claim 15, wherein the annunciator is associated with a shelf label that is also associated with the communication device.

17. The mobile retail signage management system claimed in claim 15, wherein the annunciator is selected from the group consisting of an icon, an LED, an audible generation device, an image displayed at the shelf label, and an updatable electronic display associated with the shelf label.

18. The mobile retail signage management system claimed in claim 15, wherein the portable workstation itself functions as the annunciator by using wireless means to determine the direction and/or distance where the communication device is located.

19. The mobile retail signage management system claimed in claim 18, wherein upon receipt of determination of the direction and/or distance a second annunciator associated with a shelf label provides visual or audible means for guiding the clerk to the specific location.

20. The mobile retail signage management system claimed in claim 1, wherein the sign writer for imaging the corresponding sign in real-time images the corresponding sign in less than 10 seconds.

21. The mobile retail signage management system claimed in claim 1, wherein the means for alerting a clerk enables the corresponding sign to be positioned at the specific location within less than 30 seconds.

22. The mobile retail signage management system claimed in claim 1, wherein the near vicinity of the portable workstation with respect to the communication device is less than 10 meters.

23. A method for dynamically altering, in real-time, a retail sign at a specific location using a portable workstation that communicates with a communication device at the specific location, comprising the steps of:
   a) updating a product database within the portable workstation via a computer network communicatively connectable to the portable workstation;
   b) communicating from the portable workstation to the communication device as the portable workstation comes within communication range of the communication device, wherein the communication range corresponds to the near vicinity of the portable workstation with respect to the communication device;
   c) transmitting the specific location from the communication device for which a corresponding sign needs to be positioned at the specific location to the portable workstation;
   d) associating product information with the specific location transmitted from the communication device, wherein the product information includes display information for the corresponding sign positioned at the specific location;
   e) alerting a clerk that the corresponding sign needs to be imaged and positioned at the specific location; and
   f) imaging the corresponding sign in real-time, in the near vicinity of the specific location.

24. The method claimed in claim 23, wherein imaging the corresponding sign in real-time, in the near vicinity of the specific location is accomplished with a sign writer.

25. The method claimed in claim 23, wherein transmitting the specific location is in response to a call from the portable workstation.

26. The method claimed in claim 23, wherein transmitting the specific location is constant.

27. The method claimed in claim 24, wherein the sign writer for imaging the corresponding sign in real-time images the corresponding sign in less than 10 seconds.

28. The method claimed in claim 23, wherein the step of alerting a clerk enables the corresponding sign to be positioned at the specific location within less than 30 seconds.

29. The method claimed in claim 23, wherein the near vicinity of the portable workstation with respect to the communication device is less than 10 meters.

30. The method claimed in claim 23, wherein the communication device is associated with an electronically updatable shelf label displaying the product information.

31. The method claimed in claim 23, wherein the communication device is associated with a holder that holds the corresponding sign.

32. The method claimed in claim 23, wherein the communication device is associated with a shelf label displaying the product information.

33. The method claimed in claim 23, wherein the step of alerting a clerk is integrated with the step of communicating from the portable workstation to the communication device as the portable workstation comes within the communication range of the communication device.

34. The method claimed in claim 33, wherein the step of alerting a clerk further includes the step of imaging the corresponding sign in real-time, while in the near vicinity of the specific location while employing a sign writer.

35. The method claimed in claim 23, wherein the communication device operates as a wireless device selected from the group consisting of a radio tracking location system (RTLS), a radio frequency identifier (RFID), visible wavelength transmissions, and invisible wavelength transmissions.

36. The method claimed in claim 24, wherein the sign writer is a light writer capable of imaging the product information for the corresponding sign on light writable media.

37. The method claimed in claim 23, wherein the corresponding sign is reusable media and selected from the group consisting of a liquid crystal display, zenithal bistable liquid crystal display, electrochromic display, electrophoretic display, and bichromal bead display.

38. The method claimed in claim 36, wherein the light writable media is a bistable cholesteric liquid crystal display.

39. The method claimed in claim 23, wherein the step of alerting a clerk includes displaying an onscreen image on the portable workstation and/or displaying an image on the corresponding sign.

40. The method claimed in claim 23, wherein the step of alerting a clerk includes emanating an audible warning.

41. The method claimed in claim 23, wherein the computer network resides in a central computer for retail operation.

42. The method claimed in claim 23, further comprising the step of:
   g) guiding the clerk to the specific location where the corresponding sign is to be positioned using visual or audible means as an annunciator.

43. The method claimed in claim 42, wherein the annunciator is associated with a shelf label that is also associated with the communication device.

44. The method claimed in claim 42, wherein the annunciator is selected from the group consisting of an icon, an LED, an audible generation device, an image displayed at the shelf label, and an updatable electronic display associated with the shelf label.

45. The method claimed in claim 42, wherein the portable workstation, as the annunciator, performs the steps of guiding the clerk to the specific location where the corresponding sign is to be positioned using visual or audible means and determining the direction and/or distance where the communication device is located using wireless means.

46. The method claimed in claim 45, wherein subsequent to the step of determining the direction and/or distance where the communication device is located using wireless means a second annunciator associated with a second shelf label provides visual or audible means for guiding the clerk to the specific location.

47. The mobile retail signage management system claimed in claim 10, wherein the reusable media is a bistable cholesteric liquid crystal display.

48. The method claimed in claim 37, wherein the reusable media is a bistable cholesteric liquid crystal display.

* * * * *